(12) United States Patent
Chheda et al.

(10) Patent No.: US 6,996,056 B2
(45) Date of Patent: Feb. 7, 2006

(54) METHOD AND APPARATUS FOR ORTHOGONAL CODE MANAGEMENT IN CDMA SYSTEMS USING SMART ANTENNA TECHNOLOGY

(75) Inventors: Ashvin H. Chheda, Plano, TX (US); Yiping Wang, Plano, TX (US); Mehmet Yavuz, Irving, TX (US)

(73) Assignee: Nortel Networks Limited, St. Laurent (CA)

( * ) Notice: Subject to any disclaimer, the term of this patent is extended or adjusted under 35 U.S.C. 154(b) by 793 days.

(21) Appl. No.: 09/871,581

(22) Filed: May 31, 2001

(65) Prior Publication Data

US 2003/0114162 A1  Jun. 19, 2003

(51) Int. Cl.
   *H04J 11/00* (2006.01)

(52) U.S. Cl. ............... 370/209; 370/320; 370/335; 370/342; 370/441

(58) Field of Classification Search ............ 370/320, 370/335, 342, 441, 208, 329, 331, 332, 333, 370/334; 375/130, 140, 146, 147; 455/13.3, 455/24, 25, 63.4, 561, 562.1
See application file for complete search history.

(56) References Cited

U.S. PATENT DOCUMENTS 5,621,752 A * 4/1997 Antonio et al. .......... 375/144

6,229,796 B1 5/2001 Dent
6,388,998 B1 * 5/2002 Kasturia .............. 370/320

FOREIGN PATENT DOCUMENTS

| EP | 1 026 911 A2 | 8/2000 |
| WO | WO 99 60809 | 11/1999 |
| WO | WO 99/60809 | * 11/1999 |

OTHER PUBLICATIONS

Naguib et al, Capacity Improvement with Base–Station Antenna Arrays in Cellular CDMA, IEEE, pp. 691–698, 1994.*

* cited by examiner

*Primary Examiner*—Frank Duong
(74) *Attorney, Agent, or Firm*—Garlick Harrison & Markison LLP; James A. Harrison (57) ABSTRACT

A method and apparatus for enabling Orthogonal codes to be reused within the same cell of a code division multiple access telecommunication network includes an base station transceiver system that comprises logic circuitry for enabling the base station transceiver system to reuse Orthogonal codes in a manner that reduces the likelihood of collision between two mobile stations having the same Orthogonal code and corresponding communication channels. The method of the present invention specifically includes analyzing user characteristics including factors such as his physical movement, location and mobile station communication type, as well as angular placement

34 Claims, 8 Drawing Sheets

| INTERFERENCE TABLE | |
|---|---|
| WEIGHT | ZONE |
| W(1) | Z(8) |
| W(2) | Z(7) |
| W(2) | Z(1) |
| W(3) | Z(6) |
| W(4) | Z(9) |
| W(5) | Z(4) |
| W(6) | Z(3) |
| W(7) | Z(11) |
| W(8) | Z(5) |
| W(9) | Z(12) |
| W(10) | Z(4) |
| W(11) | Z(8) |

FIG. 3B

| ANGULAR RANKINGS | |
|---|---|
| WEIGHT | ZONE |
| W(1) | Z(8) |
| W(2) | Z(7), Z(9) |
| W(3) | Z(6), Z(10) |
| W(4) | Z(5), Z(11) |
| W(5) | Z(4), Z(12) |
| W(6) | Z(3), Z(1) |

METHOD AND APPARATUS FOR ORTHOGONAL CODE MANAGEMENT IN CDMA SYSTEMS USING SMART ANTENNA TECHNOLOGY

BACKGROUND

1. Field of the Invention

The present invention relates generally to communication systems and more particularly, to the assignment of Orthogonal codes in a code division multiple access communication system.

2. Description of Related Art

The Federal Communications Commission (FCC) governs the use of the radio frequency (RF) spectrum, deciding which industry gets certain frequencies. Since the RF spectrum is limited, only a small portion of the spectrum can be assigned to each industry. The assigned spectrum, therefore, must be used efficiently in order to allow as many mobile stations as possible to have access to the spectrum.

Multiple access modulation techniques are some of the most efficient techniques for utilizing the RF spectrum. Examples of such modulation techniques include time division multiple access (TDMA), frequency division multiple access (FDMA), and code division multiple access (CDMA). CDMA modulation employs a spread spectrum technique for the transmission of information. A spread spectrum system uses a modulation technique that spreads a transmitted signal over a wide frequency band. This frequency band is typically substantially wider than the minimum bandwidth required for transmitting the signal. The spread spectrum technique is accomplished by modulating each baseband data signal to be transmitted with a unique wideband spreading code. Using this technique, a signal having the bandwidth of only a few kilohertz can be spread over a bandwidth of more than a megahertz.

A form of frequency diversity is obtained by spreading the transmitted signal over a wide frequency range. Since only 200–300 kHz of a signal is typically affected by a frequency selected fade, the remaining spectrum of the transmitted signal is unaffected. A receiver that receives the spread spectrum signal, therefore, will be affected less by the fade condition. In addition, such a system has good performance in cases where interference may occupy a narrow-band.

In a CDMA-type radiotelephone system, multiple signals are transmitted simultaneously over the same frequency bandwidth. A particular receiver then determines which signal was intended for that receiver by a unique spreading code in the signal. The signals in that frequency bandwidth, without the particular spreading code intended for the particular receiver, appear to be noise to that receiver and are reduced by the processing gain of the system.

Because code division multiple access networks employ a system in which all transmissions occur in the same frequency band, it is well known that it is important to transmit at the lowest possible power that allows for the delivery of a communication signal at a certain level of accuracy or grade of service criteria. The reason that it is important for base stations to transmit to mobile stations with a minimal level of power and, on the reverse link, for mobile stations to transmit to base stations with minimal amount of power, is that each transmission adds to the noise level for all other receivers. In addition, if the per mobile station power on the forward link is minimized there is more power available for other mobile stations, thereby increasing the capacity of the system. Similarly on the reverse link, if less power is used, apart from the interference benefits mentioned above, the mobile station can extend its battery life and/or range of transmission.

In CDMA systems, the network consists of a plurality of cells. Each cell may also contain a plurality of sectors, depending on the deployment scenario. Each sector is distinguished from any of the other sectors by the use of a pseudo random code. In the IS2000/IS95 version of CDMA, these are known as PN sequences. In the UMTS version of CDMA, segments of Gold codes are used by each sector to accomplish the same effect. Therefore a user attempting to de-correlate signals from a particular sector must use the appropriate sequence. Within each sector a plurality of mobiles may be actively communicating with the system. Mobiles within the same sector are distinguished from one another by the use of Orthogonal codes. Therefore a particular user in a sector can extract its signal uniquely from the multitude of signals being transmitted by that sector. In IS2000/IS95 these Orthogonal codes are known as Walsh codes. In UMTS, these codes are generated by a technique call the OVSF or Orthogonal Variable Spreading Factor technique, but are essentially Walsh codes. For example, in IS2000 RC3 code division multiple access networks, there are up to 64 Walsh Codes that may be selected for use at 9600 bits/second to create a communication channel for users operating at this rate. In an IS2000 RC4 CDMA network, however, up to 128 Walsh Codes may be used for 9600 bits/second users. According to the system design, these Walsh Codes form the entire pool of codes that may be used either within a cell, or within a sector, according to the system design.

These Orthogonal codes, however, also must be used for overhead channels. Additionally, soft handoff reduces the number of Orthogonal codes that are available, as multiple codes have to be allocated for mobile stations that are in handoff. Accordingly, even though 64 or 128 Walsh Codes are available per sector or cell, in the above example, the use of Walsh Codes for the overhead and soft handoff conditions effectively limits the number of Walsh Codes that are available for assignment to mobile stations to approximately 30 or 60 Walsh Codes according to whether the system is an RC3 or RC4 system.

Stated differently, the limited number of Orthogonal codes limits the maximum number of simultaneous traffic channels that may be supported. In the past, the small number of Orthogonal codes had not been the limiting factor in terms of network capacity. Rather, the aforementioned power control issues have typically been the predominate factor in limiting access to a network. Smart antennas are now available, however, for use in code division multiple access communication systems.

Smart antennas increase the power-blocking limit by a large amount due to the intrinsic interference suppression properties that are associated with smart antennas. The power-blocking limit is a limit set by system designers at which to block incoming calls, to ensure that the Base Station power amplifier is not overdriven, and that an unstable system operating point threshold is not exceeded. As more users are allowed access to the system, power must be allocated on the forward link or downlink for each of the users. The Base station power amplifier can only handle a certain output power, before being damaged. In addition, if there were no limit to the output power, and assuming the Base station power amplifier does not burn out, a point will be reached where each user will start to rapidly require more and more power to meet the call quality requirements. Once this point is reached, each user individually could require large amounts of power to maintain their call quality. If the power were granted to these users, it would contribute large amounts of interference further fueling the power increase requirements. The point at which these unstable situation occurs is sometimes called asymptotic capacity. Thus, because smart antenna technology reduces the power required per sector for a mobile station by large amounts, it would appear that many more mobile stations can be supported in a sector or cell. The threshold, which is a function of the number of users, due to power blocking, has been significantly increased.

Because the power-blocking threshold has been increased, the Orthogonal code limitation discussed above becomes the limiting factor. Because Orthogonal code blocking, rather than power-blocking, will be the threshold limit to capacity of a telecommunication network in future systems employing smart antennas, the service provider can realize additional revenue if network capacity can be increased. However, because there are a limited number of Orthogonal codes in the system (as an example, only 64 Orthogonal Walsh Codes that may be used in an RC3 system and 128 Walsh Codes in an RC4 system), additional codes may not readily be created. It should be noted that the number of Orthogonal codes can be increased by lowering the data rate of each user in the sector, but for next generation services this is not a viable option. In addition, basic services such as voice require as certain operating data rate to ensure good call quality. Also, there is certain minimum operating rates specified in the IS2000 and UMTS standards.

As is known by those skilled in the art, the number of Orthogonal Codes that exists is limited by their very nature of being Orthogonal. Other approaches are being considered to increase the number of mobile stations that may be served in a defined service area. One approach is to define a group of quasi-Orthogonal codes. Quasi-Orthogonal codes can increase the number of usable codes by creating a family of code groups with certain properties. The codes used from the same family would be completely Orthogonal to each other, but the codes used from separate families would be somewhat Orthogonal, and as a result contribute somewhat less interference to each other. As a result, the use of quasi-Orthogonal codes only provides gain in fixed wireless access systems where there is no mobility or location change of the wireless terminals. In addition, only a limited number of quasi-Orthogonal codes can be used. This is because the large number of users using the regular Orthogonal codes from one family will provide very large interference to the few users using the quasi-Orthogonal codes from another family, and will cause them to transmit at very high powers. This may result in poor voice quality for some of the users, especially users nearer the cell edge where they would already be operating closer to their upper limits of power, and will ultimately reduce the aforementioned power blocking limit. Also, each group of quasi-Orthogonal functions requires their own pilot channel, for optimal performance, thereby using additional overhead power. For these and other reasons, the use of quasi-Orthogonal codes is problematic and reduces network reliability. Finally, it should be mentioned that the UMTS standard does not allow for the use of quasi-Orthogonal functions. At present, only the IS2000 standard allows their use.

What is needed, therefore, is a way of increasing the capacity of a code division multiple access network, and more particularly, increasing the number of communication channels notwithstanding the limitation of the number of Orthogonal codes that are available for use by a mobile terminal.

SUMMARY OF THE INVENTION

A method and apparatus is provided that increases network capacity by reusing Orthogonal codes per sector to create additional communication channels in a manner that minimizes the likelihood of interference or "collision" between two mobile stations using the same Orthogonal code for their communication channels within the same sector. It should be understood that users in different sectors are using the same family of Orthogonal codes. However, the fact that each sector utilizes a different PN sequence, results in interference between sectors. Hence, trying to coordinate the use of Orthogonal codes between sectors is pointless, and would further severely limit the codes. In the embodiments of the present invention, smart (beam forming) antennas are used to focus the forward link transmission energy in the direction of the user. Accordingly, by monitoring the direction or angle of arrival of the transmission energy, and also by studying the characteristics of the side lobes for such a transmissions, Orthogonal codes may be assigned to mobile stations in which the primary focused transmission beams as well as the side lobes of those transmission beams will not interfere (or the level of interference will most likely be minimal with the transmission beams of other mobile station(s) reusing the same Orthogonal code. Because the present system facilitates the use of Orthogonal codes by multiple mobile stations network capacity is increased.

One important goal of a system in which Orthogonal codes are used by more than one mobile station is to assign the codes in a manner that avoids or minimizes the likelihood of collision. Collision occurs when one mobile station receives the communication signals that were intended for another mobile station using the same Orthogonal code/ communication channel and spreading sequence, i.e. users within the same sector reusing the same Orthogonal code. Thus, one aspect of the present invention is to identify how to properly select codes that are being used by more than one mobile station for reuse in a particular sector.

The present invention includes a cell that is divided into a plurality of sectors, each of which takes on many operational characteristics of a cell. Accordingly, a mobile station transitioning from one sector to another even undergoes soft handoff. In this scheme, each sector having a set of Orthogonal codes is divided into a number of zones. Accordingly, an Orthogonal code will not usually be reassigned to another mobile station in any zone in which the primary transmission energy is focused or in any zone containing significant transmission energy from a side lobe. In one embodiment of the invention, however, Orthogonal codes may be considered for selection from users within the same cell (omnicell) or cell sector of a multi-sectored cell for users operating at a different frequency in a multi-carrier CDMA network. Additionally, various criteria, as described herein, are analyzed in order to determine which of the remaining zones are best for selecting an Orthogonal code for assignment to another user.

Thus, by evaluating criteria such as the potential interference between zones reusing the same Orthogonal codes, angular separation between a mobile station being evaluated for having his Orthogonal code reused (donor) and the mobile station that is to be assigned the reused Orthogonal code (recipient), the Orthogonal codes being used in each zone, the various movement parameters of the donor, such as speed, direction and location, and other factors including frame error rate and power, the present system selects an Orthogonal code that is optimal for assignment to the recipient mobile station.

For each user in a sector, the following information is maintained (assuming that the various algorithms/features required to obtain such information are implemented), and used to generate weights; these include: the distance from sector site center, the mobile's speed, the mobile's direction, the call data rate, the call type, the duration of the call and expected duration of call, the current frame error rate of user as compared to its expected operating frame error rate, the current power in use by the user as compared to its upper limit of power, the handoff state, the angle of arrival of the user, the determination as to whether the Walsh code assigned to the user is already in use by another zone within the same sector (and by how many), and the determination as to whether the user is employing a narrow beam and at the properties of such a narrow beam (since different users can be using different beams). This information can be stored at the base station controller or at the individual base stations. In some cases, due to the open interface nature between the various connecting nodes in a network, it may be preferred to have such information stored at the base station. Once the system has determined that a need exists to reuse Orthogonal codes to satisfy throughput capacity demands, and the system determines what zones are available from which to borrow an Orthogonal code for a particular user, relative to the recipient's location, a list of candidate Orthogonal codes in use by other terminals within the same sector are generated or evaluated from those zones that have not been eliminated from consideration. The codes to be evaluated can come from users within the same frequency band or users within another frequency band, if the particular network or sector is utilizing multiple carriers. The particular donor factors that are evaluated and ranked as a part of determining the optimal codes for assignment to other mobile stations in the described embodiment of the invention, include determining whether an Orthogonal code is being used by a fixed wireless access "non-mobile" mobile station, and if a mobile station is not fixed wireless, determining its speed. Additionally, as will be explained in greater detail herein the application, the direction in which the mobile station is traveling, its location from which the distance from the cell site center and angle or arrival are known or computed, whether it is a data or voice user, if the mobile station is transmitting data, the data rate and the characteristic of the data (e.g., bursty data versus streaming video (continuous)), the duration of the call and the expected duration of the call based on the type of call, the frame error rate for the mobile station and its relation to the expected frame error rate target, the current forward link power being transmitted to the mobile station and its relation to the predefined upper limit of power allowed for that particular user, the mobile station interference in the current zone (from which the code will be selected) relative to the location of the mobile station in the mobile station zone needing the code, the correlation between time and speed, whether a hysterisis is in effect for a particular mobile station because of soft or hard handoffs which that mobile station has recently undergone, how many times the candidate Orthogonal code is currently being reused, and other factors.

An example of another factor might be a mapping between the call duration relative to the movement or velocity sector of the user. For example, in many circumstances, a mobile station that is traveling is expected to have conversations of shorter duration than those mobile stations that are stationary for reasons including safety and legality.

The method for assigning Orthogonal codes in CDMA networks includes the step of determining if there is a need to reuse a code within a defined cell/sector area. This determination step further includes the step of determining there is a need to reuse a code because of an eminent collision between a reused code and another mobile station using the same code in the same sector. Once the codes are reused, the collision detection becomes an important aspect of the algorithm. If the collision is allowed to happen both users reusing the Walsh codes will suffer call degradation. On detecting the collision, the system can direct one of the calls to another Walsh code via a hard handoff to the same frequency and sector, but with different traffic channel Walsh code(s). In addition, if there are multiple carriers in use within such a system, the hard handoff can be to a different frequency band, if there is an available Orthogonal code in the other frequency band(s). If there are Walsh codes available at this point, the call expected to remain on the system longer can be assigned the new code. If another code must be reused then codes are determined for both users using Step 1 and 2 above, and the user who has a code that can be reused with the higher weight undergoes the hard handoff.

In a system incorporating multiple carriers, users would be likely assigned to a frequency band using some sort of multi-carrier traffic allocation algorithm. Once, the Walsh codes of all the usable frequency bands within the sector are depleted, then the Orthogonal code reuse algorithm can kick in to determine suitable candidates for code reuse. As users terminate their calls within different frequency bands, then Orthogonal codes may again free up and it is therefore important for any multi-carrier traffic allocation algorithm to be modified to include this Orthogonal code reuse algorithm. Hence, the Orthogonal code reuse algorithm should include the various triggers for users in all usable frequency bands within the same sector.

The collision detection can use a subset of the properties described herein. The most important of which would be observing when the measured frame error rate of the call exceeds the target frame error rate by a given threshold for a given pre-determined period of time. If the distance between the users narrows, either because they are moving in the same direction or at different speeds, or closer towards the sector site center, appropriate thresholds can be defined to trigger the hard handoff. Finally if the users move into zones that are not zone complement pairs and that actually have poor interference properties, the appropriate thresholds can be triggered.

As an alternative to the hard handoff, and if there are available degrees of freedom, the smart antenna of the two users can be adjusted individually such that nulls are placed in each others angular position. However, this is difficult to manage as the users may be moving and are also interacting with other users in the sector.

Thus, the types of data points that are evaluated include analyzing whether the frame error rate is increasing, and, if so, observing either the rate of increase or that a specified threshold has been reached, evaluating the rate of change of the forward link traffic transmit power, observing a change in speed, for example, a significant increase in speed, observing a change in direction in a direction that suggests that the two mobile stations of the same code may wind up in interfering sector zones, observing a handoff that is occurring to a non-compatible zone, observing that the mobile station is moving toward a cell center, or observing that the signal quality has fallen below a specified threshold.

As may be seen, the present invention includes a process that, generally, attempts to minimize the likelihood of a collision or interference between two mobile stations having been assigned the same Orthogonal code. Thus, the present invention contemplates a method that attempts to make choices that minimize the likelihood of an undesirable collision. The invention thus also includes continuously monitoring the mobile stations having the same code to determine if the odds of a collision are increasing for any one or more of a plurality of factors. In the event that a certain probability of a collision reaches a specified threshold, the invention includes reassigning one of the mobile stations of the re-used Orthogonal code a new reused (if necessary) Orthogonal code that has a lower probability of experiencing a collision.

DETAILED DESCRIPTION OF THE DRAWINGS

Figure 1:
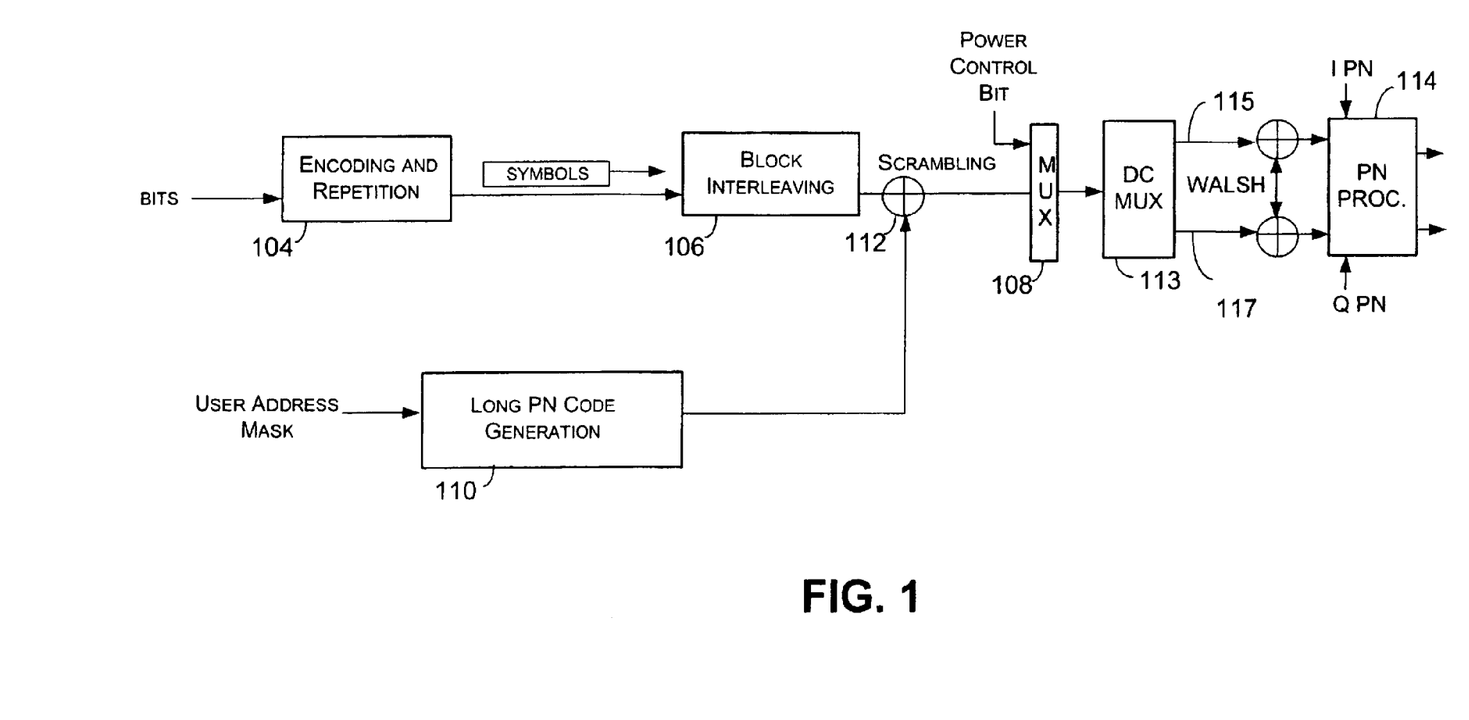
FIG. 1 illustrates a typical CDMA transmitter system for use on the forward channel from a base transceiver system (BTS) to a CDMA mobile station.

FIG. 1 illustrates a typical IS95/IS2000 CDMA transmitter system for use on the forward channel from a base station transceiver system (BTS) to a CDMA mobile station. The UMTS standard also has its own different transmitter system for use on the downlink (forward link) channel; but fundamentally, the two systems are spread spectrum technologies facing the same Orthogonal code issues. An encoder 104 creates a digital baseband signal by encoding a digitized signal representing an analog voice or digital data service. An encoder 104 accepts data bits in and produces code symbols on an output. For each clock cycle, a new data bit is shifted into a register of the encoder 104. In CDMA the shift register is typically of length 8. As each data bit is shifted in, the other 7 previous values are shifted by one position, and the oldest is shifted out. Some of the various inputs of an encoder in the shift register are added (modulo 2) in a certain fashion to produce two or more symbols out for each clock cycle. Since the new symbols generated for each clock cycle are derived from the values of the new bits being input, a certain level of predictability can be realized. The output symbols of the encoder 104 are then produced to a block interleaver 106. The block interleaver 106 serves to create a matrix of symbols wherein each matrix represents all of the information within a defined interval. For example, in one embodiment, 384 modulation symbols may be entered into an array at a rate of 19,200 symbols per second. The array is then rearranged to create an output array to decorrelate the data and to separate adjacent symbols in time.

One advantage of this process is that the effects of bursty errors may be diminished since the sequence of data has been decorrelated, and information eliminated by the bursty error may potentially be recovered on decoding. Moreover, in some embodiments, lower transmission rate data is repeated. Here, the lower rate repeated symbols are also separated therefore increasing the survivability of symbols to signal bit errors. In addition, for reasons beyond this application, the data array that is output by the block interleaver 106 is slightly modified in that defined power control bits are inserted in place of various data symbols.

The power control bits are used for power control purposes to optimize network effectiveness. Each symbol that is output from the multiplexer 108 is produced to a de-multiplexer 113, which passes the input bits alternately to an in-phase branch 115 and a quadrature branch 117. Each symbol that is output from the de-multiplexer 113 is exclusively ORed with an assigned Walsh function. The Walsh function is what, in a CDMA context, creates the Orthogonal channels of communication.

Continuing to refer to FIG. 1, a long PN code generator 110 generates long pseudo random number (PN) sequences to generate user-specific sequences of symbols. The Orthogonal code spread symbols from the combiner 112 are then spread in quadrature. The symbols are input to two exclusive OR combiners to generate a pair of short PN sequences. The first combiner exclusively ORs the Orthogonal code spread symbols on the in-phase branch 115 with the end phase sequence while the second combiner exclusively ORs the Orthogonal code spread symbols on the branch 117 with the quadrature phase (I) and (Q) sequences. The I and Q sequences are then produced to a PN processor 114 that, in turn, produces the final In Phase and Quadrature chip sequences for transmission.

The resulting I and Q channel code spread sequences are used to bi-phase modulate a quadrature pair of sinusoids by driving the power level of the pair of sinusoids. The sinusoidal output signals are then processed for transmission by an antenna.

Figure 2:
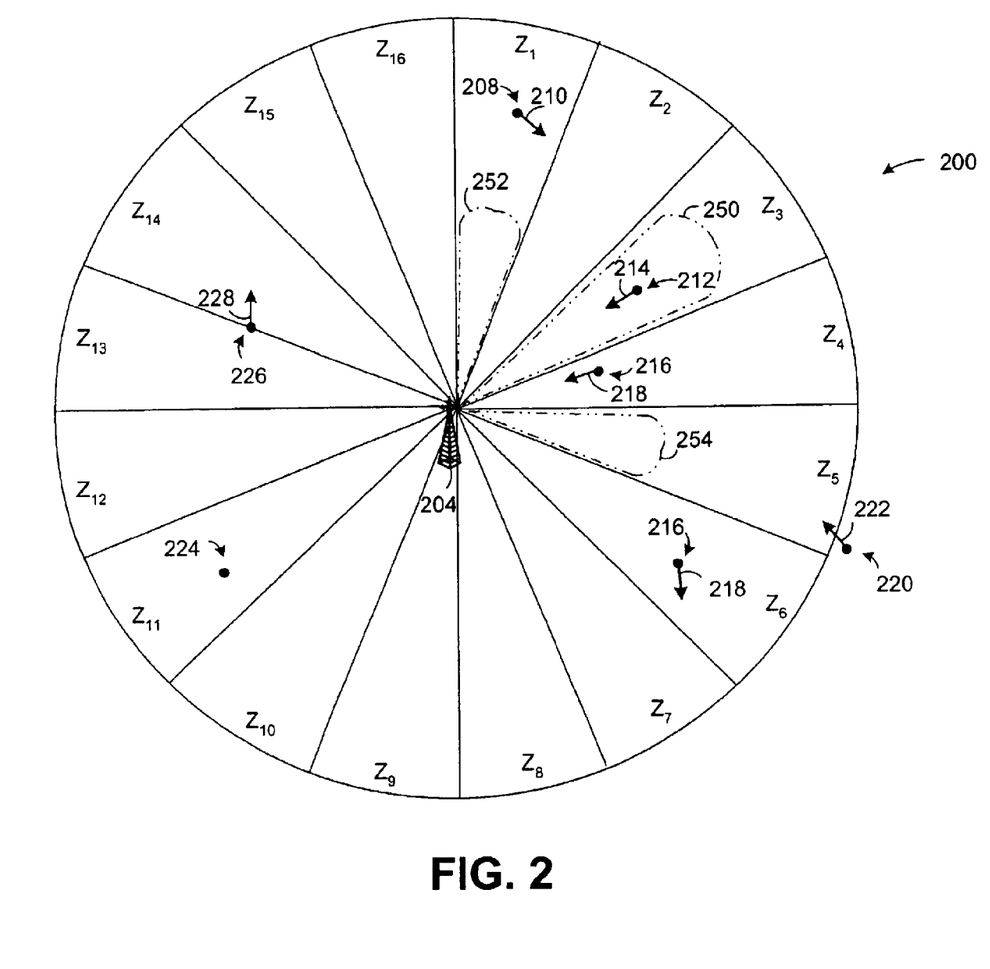
FIG. 2 is an illustration of a cell within a communication network in which a plurality of mobile stations is in communication with a base station transceiver system, each being within a defined zone.

FIG. 2 is an illustration of an omni-cell within a communication network in which a plurality of mobile stations is in communication with a base station transceiver system, each being within a defined zone. Referring now to FIG. 2, a cell shown generally at 200 includes a base station transceiver system (BTS) 204 that communicates with mobile stations utilizing a code division multiple access scheme in which the communication channels between the BTS and each mobile station is created by one of a group of Orthogonal codes.

For the purposes of this explanation, the cell in FIG. 2 is an omni-cell. That is, there is one base station covering the area, and using one PN sequence (if IS95/IS2000 cell). The following description can be related to a tri-sectored or N-sectored cell, as each sector within the cell can be treated independently from one another, in fact as separate cells with regards to the description below, as they would all be using separate PN sequences and possibly separate antenna arrays and hardware elements within one or multiple base stations. For the purposes of this example, therefore, the discussion is in terms of an omni-cell in which cell sectors are not defined. In a network in which each cell is sectored and in which each sector has its own set of Orthogonal codes assigned, the examples herein apply equally well in sector in which zones are defined.

As may be seen, each mobile station is within a defined zone or is on a border between two cell zones. For example, a mobile station 208 is located within zone 1 and is traveling in the direction shown generally at 210. A second mobile station 212 is traveling in a direction 214 within zone 3. A third mobile station 216 is traveling in a direction 218 within zone 4, wherein direction 218 is approximately toward the center of the cell 200. A fourth mobile station 216 is traveling in a direction shown generally at 218 within zone 6.

A fifth user, shown generally at 220 is outside of the range of cell 200 but is traveling in a direction 222 into zone 5 of the omni-cell. Accordingly, as mobile station 220 travels into omni-cell 200, handoff from another BTS to BTS 204 will occur. For the handoff to occur, however, BTS 204 must assign an Orthogonal code to mobile station 220 to create the communication channel between the BTS and mobile station 220.

A sixth user, shown generally at 224, is shown within zone 11 and is stationary. A seventh user, shown generally at 226, is traveling in a direction shown at 228 and is proximately located on the border between zones 13 and 14. Accordingly, a hard handoff occurs for the mobile station 226 as it travels from one zone to another thereby requiring BTS 204 to assign a new communication channel at the same or different frequency band if the current communication channel (Orthogonal code) cannot be used within zone 14.

FIG. 2 further includes diagrams that illustrate theoretical primary lobe and side lobes that occur with the use of directional or smart antennas. More specifically, for exemplary purposes, the illustration of FIG. 2 shows a primary lobe 250 and two side lobes 252 and 254. In reality, the transmissions from the directional antenna of BTS 204 may have a different number of side lobes that vary in size and shape. In fact, there may be a certain level of energy in every zone other than the principle lobe. Consequently, the system operators must keep track of the average energy level expected in each zone. The purpose of the illustration FIG. 2, therefore, is to demonstrate the inventive concept herein.

In general, an Orthogonal code that is assigned to mobile station 212 will be transmitted in a primary lobe transmitted from BTS 204 towards mobile station 212 as is shown by lobe 250. The side lobes 252 and 254, in the example herein, are located within zones 1 and 5. Accordingly, a conclusion is drawn that an Orthogonal code certainly may not be assigned to multiple mobile stations within zones 1, 3 and 5 because of a certain collision that would occur when the multiple mobile stations in those zones attempt to communicate over the same communication channel created by the same Orthogonal code.

As may be seen, therefore, it is important to evaluate mobile station characteristics including location as candidate mobile stations are evaluated as "donors" for having their Orthogonal codes reused. For example, if mobile station 220 is in the process of traveling into zone 5 of cell 200, and there are no unused Orthogonal codes to be assigned during the handoff process, BTS 204 will analyze the positions and direction vectors of the mobile stations within its cell to find the best donors.

Thus, for example, between mobile stations 216 and 224, mobile station 224 is preferable over mobile station 216 for a variety of reasons. First, mobile station 224 is in a zone that has greater angular separation from zone 5 (the zone into which mobile station 220 is traveling). Moreover, mobile station 220's direction vector 222 is towards zone 4 where mobile station 216 is presently located. Accordingly, it and mobile station 220 are somewhat likely to wind up in the same zone with a direct collision between their respective communication channels. Moreover, mobile station 216 is headed towards the cell center, which also is undesirable because being in a cell center improves the likelihood of a collision. This is because of two reasons.

First, users that are nearer the center of the cell site are also closer to each other distance-wise. Secondly, the antenna patterns usually have a lot of interference, due to their vertical patterns (not shown) towards the center of the cell site or antenna mast. In fact, this concept can be further extended if the deployment warrants the complexity, to include the vertical patterns as well as the horizontal patterns (shown) of the antenna.

Because mobile station 224, on the other hand, is nowhere near zone 5 or mobile station 220, and because mobile station 224 is stationary, the likelihood of a collision between mobile station 220 and mobile station 224 is lower than that between mobile station 224 and mobile station 216.

Examining other mobile stations, mobile station 212 also is headed toward the center of the cell, which makes the likelihood of a collision greater and is therefore, less desirable. Mobile station 208 is traveling in a direction 210 that is approximately opposite that of mobile station 220 which is traveling in direction 222. Because a likelihood exists that both mobile stations are headed towards each other and may wind up in the same zone, they may directly interfere with each other resulting in a communication channel collision. Additionally, even if mobile station 208 were stationary, for example, mobile station 208 is in an interfering zone with respect to zone 5. As may be seen, the side lobes 252 and 254 are in zones 1 and 5 thereby rendering those zones to be interfering zones. Accordingly, the Orthogonal code of mobile station 208 is eliminated from consideration in the present invention in most circumstances because of the relationship between the two zones. Finally, it is worth noting that a smart antenna typically creates some amount of interference in most other zones within a sector or cell other than the primary lobe, due to the nature of the smart antenna. In reality, there may be the very dominant main or primary lobe, and a few secondary lobes that area also significant, and many minor lobes. Accordingly, in assigning weights, one approach includes merely assigning the highest weight to the zone having the lowest or lowest value of expected signal energy relative to the primary lobe's zone. Alternatively, and for greater accuracy, the lowest average amount of interference across the zone may be evaluated. Additionally, if two interference values are similar (not necessarily equal), then other factors such as the interference levels of adjacent zones may be considered.

Figure 3A:
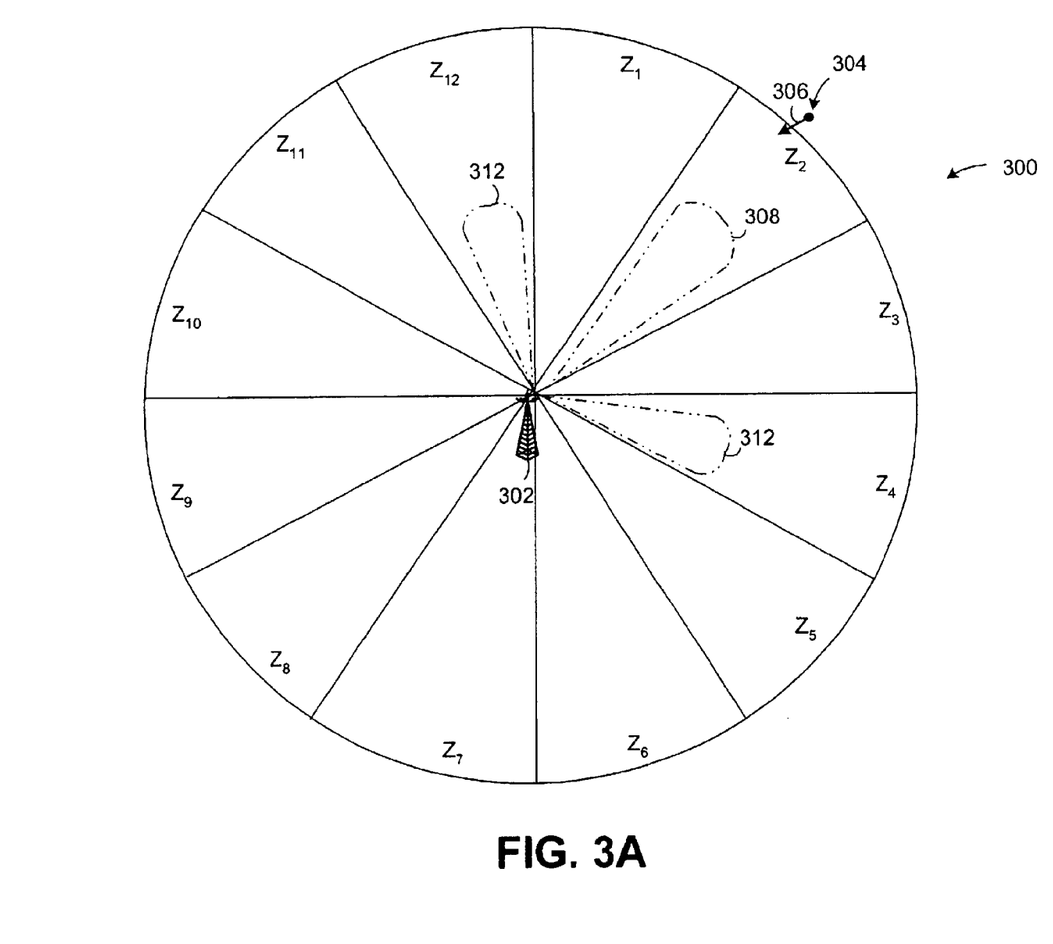
FIGS. 3A, 3B and 3C are illustrations that show a first step in identifying an Orthogonal code that is to be reused by a new mobile station.
Figure 3B:
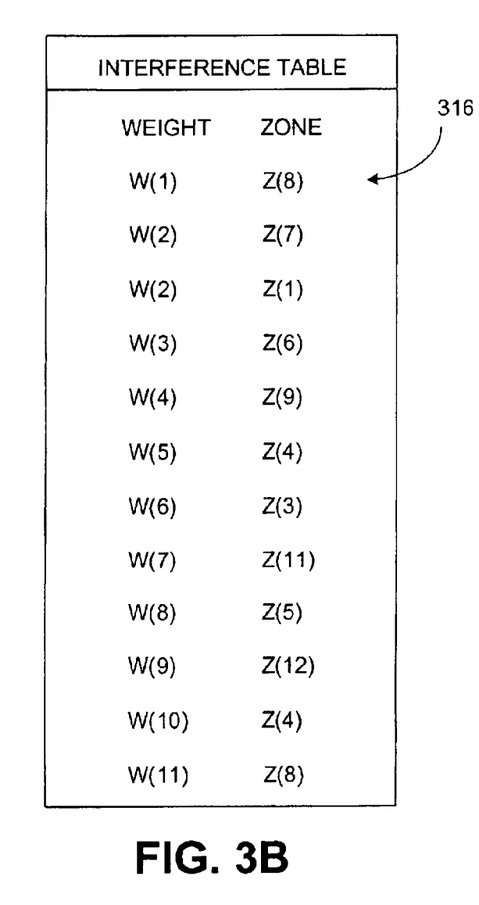
Figure 3C:
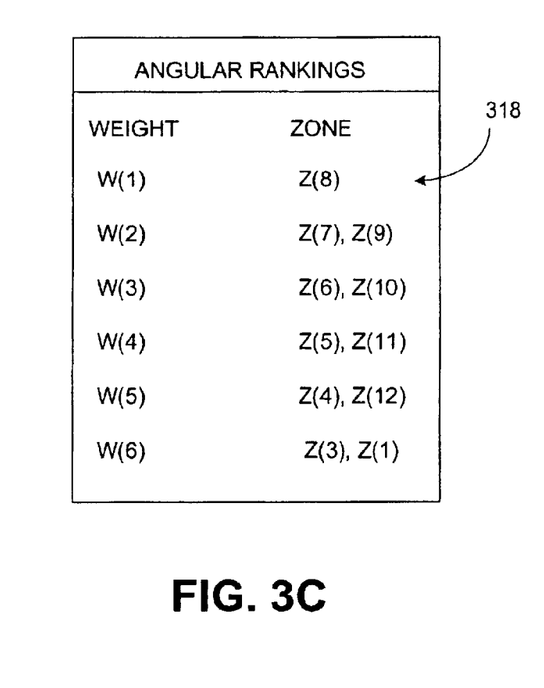

FIGS. 3A, 3B and 3C are illustrations that show a first step in identifying an Orthogonal code that is to be reused by a new mobile station. More specifically, FIGS. 3A, 3B and 3C collectively illustrate the steps used in selecting a donor mobile station whose Orthogonal code may be borrowed for reuse according to one aspect of the present invention. Referring now to FIG. 3A, a simpler cell diagram is illustrated in which the cell is divided into 12 zones instead of 16 zones as in FIG. 2. As may be seen within FIG. 3A, a mobile station is traveling into zone 2 (suggesting a handoff to BTS 302 is to occur) and is requiring an Orthogonal code to create a communication channel with BTS 302. For the exemplary purpose herein, it is assumed that there are no unused Orthogonal codes that are available for creating a communication channel with the mobile station 304.

As may also be seen, the primary lobe 308 is within zone Z2 while the side lobes 312 are in zones Z12 and Z4. FIG. 3B illustrates a ranking table that maps out the interference relationships for the various zones relative to Zone Z2. Each row illustrates a mapping of a zone and a weight that zone is given, which weight is a function of the amount of interference from side lobes for a given primary lobe from a smart antenna. For example, as shown in the first row, Zone Z9 is entered with the highest weight W(9). This is because a smart antenna focused in Zone Z2 has the least amount of side lobe energy in the direction of Zone Z9 and vice-versa. Table 3B, therefore, illustrates that the zones are ranked and given weights for the amount of interference that is expected relative to Zone 2. A table similar to that of FIG. 3B is thus defined for each of the zones in a cell (omni-cell) or cell sector (sectored cells).

One purpose of FIG. 3B is to illustrate that part of the invention that includes statically determining and maintaining an awareness, either in tabular format or in another format, interference patterns between all the zones as a result of the transmission of primary and side lobes. If the type of smart antenna can be changed in the system, then the table must be obtained as often as the antennas are changed, as the interference properties could also change. In addition, if the beamwidth of the antennas can actually be changed during the call, as some smart antennas are capable of doing, then the widest beamwidth of the smart antenna is used to generate the table.

FIG. 3C is a table that illustrates the assignment of weights according to angular separation for zones that accounts for the primary lobe and expected interference for each of the other zones. In general, the table of FIG. 3C presupposes that maximal angular separation from the primary lobe is desirable. Accordingly, the table of FIG. 3C illustrates the angular separation relative to Zone 2 and that each zone is given a weight according to its angular separation. As may be seen, for a primary lobe within zone Z2, zones Z4 and Z12 are removed from consideration because they carry the side lobes for a primary lobe in zone Z2. Thereafter, as shown generally at 318, zone Z8 is given weight W(1) (best ranking) because it has the greatest angular separation from zone Z2. Zones Z7 and Z9 are given weight W(2) (second best) because they have the second best angular separation. Zones Z6 and Z10, likewise, are given weight W(3) while zones Z5 and Z11 are given weight W(4), and zones Z12 and Z4 are given weight W(5), and finally zones Z1 and Z3 are given weight W(6) because they are adjacent to the primary lobe in zone Z1. Note that these weights may not be the same numerically as the weights in FIG. 3B.

The Zone with the highest overall would be assigned as Z2's complement pair. If, for example, all mobile station factors were the same in each of the zones, then the Orthogonal code from a mobile station in zone Z8 would be reused because it had the best ranking or highest score of the 8 zones that remain for consideration for borrowing a Orthogonal code. Thus, for example, if all 12 zones had a stationary user, then the Orthogonal code assigned to the stationary mobile station in zone Z8 would be borrowed to assign to mobile station 304 who is transitioning into zone Z2 and is requiring a Orthogonal code.

As may be seen, FIGS. 3A, 3B and 3C illustrate a first step in determining an Orthogonal code that is to be reused by a new mobile station 304. The step generally includes determining an optimal zone from which an Orthogonal code is to be borrowed. A second step, as will be explained in detail below, will include processing to determine the best donor mobile station from which an Orthogonal code should be used. It should be understood, however, that based on the results of the subsequent analyses, a mobile station within that zone that is not the highest ranked zone may be preferred as a result of the various mobile station characteristics. Thus, the actual zones are ranked and given corresponding weights so that the analysis may include selecting Orthogonal codes from mobile stations that are not in the highest ranked zone, for example, from the second or third highest ranked zones.

In selecting a user whose Orthogonal code will be assigned to a user requiring a code, other factors regarding the potential Orthogonal code "donors" also are evaluated. First, the zone complement pair are determined as described above, then the users within the zone complement are evaluated to pick the best candidate among them to have a code reused. If none exist, then the next likely zone is used, based on the weights above, and users from this zone are considered. In one embodiment of the invention, the factors that are evaluated include:

1. Distance from sector site center: If the user is further from the sector site center, it should be assigned a higher weight than if the user is closer to the sector site center. As users are closer to the sector site center the chance of collision with another user in its zone pair group reusing the same Walsh code increases. In other words, the user has to travel a smaller distance before entering other Zones. The weight can be defined by the function $W_1(d)$, where d is the distance from the sector center. It is expected that with location services/requirements mandated by the FCC, the technology would be in place to determine the location of the mobile within some error bounds.

2. Mobile speed (FWA users included): As the speed increases the weight assigned should be reduced. A mobile moving at a higher speed is more likely to transition through the zones at a faster rate and increases the chances of Walsh code reuse collision. The weight can be defined by the function $W_2(s)$, where s is the mobile speed. The fixed wireless users would make the best candidates for reuse of Walsh codes. In fact if there are large number of elements per beamforming array, the algorithm has more degrees of freedom with which to tune; this implies that a null from one fixed user reusing a Walsh code from another user can be placed exactly where the other fixed user is located.

3. Mobile direction: The direction of the terminal is important, as a terminal moving from its current zone towards its complement in the zone pair is more risky than a terminal moving away in terms of reusing the terminal's Walsh code. In addition, if the direction of the user in the complement zone pair that is requiring the Walsh code reuse is known, then the chances of collision can be further reduced. The weight can be defined by evaluating the direction the terminal is moving and the direction that the user requiring the code reuse in the complement zone is moving.

4. Call data rate: The data rate of the call should also be used to influence whether or not the Walsh code assigned to the call can be reused or not. The data rate of the call defines the Walsh code length in use, higher data rate calls deplete the Walsh code pool faster than lower rate calls. A higher rate call is more likely to be using more power, and as a result can affect another user reusing the same Walsh code or users using higher length Walsh codes from the same node, i.e. a number of higher length Walsh codes constitute a lower length Walsh code. The weight can be defined examining the data rate of the user.

5. Call type (WWW, ftp, streaming video, e-mail, voice, etc): Certain types of call are more bursty in nature, such as web browsing. Such calls should be assigned more weight as there is less likelihood of a collision when codes are reused. Calls such as streaming video, which is real time, somewhat delay sensitive, and more continuous in nature should be assigned less weight. The weight can be defined by the evaluating the type of session in progress.
6. Duration of call and expected duration of call: A call that has been ongoing for a while and is close or has exceeded the expected call time for that type of session, should be assigned a higher weight. A call that was just initiated, or a call whose expected end time is still a long time off should be assigned a lower weight. Essentially, the call more likely to finish first is less likely to have a conflict with a user reusing its code in another zone. The weight can be defined evaluating the time the call has been in progress in relation to the expected call time duration based on statistics or measurements.
7. Current frame error rate of user as compared to its expected operating frame error rate: A user whose frame error rate over a measurement period is less than or equal to its expected operating point should be assigned a higher weight. A user whose average operating frame error rate is much higher than its expected target frame error rate should be assigned a lower weight, as such a user is more sensitive to interference. The weight can be defined as function of the frame error rate (FER) and the $FER_{target}$ where FER is the current operating frame error rate over the pre-defined measurement period and $FER_{target}$ is the target frame error rate for the user.
8. Current power in use by user as compared to its upper limit of power: A user whose average power over a measurement period is closer to its upper limit of power should be assigned a lower weight than one that is not as close to its upper limit. Users close to the upper limit would not have much room for more power if the interference increases due to collision with another user reusing the same code. The weight can be defined by evaluating the current average power in use over the measurement period in relation to the upper power limit for the user or service type.
9. Handoff state: A user in handoff is more likely to be away from the sector site center. It also is more likely to handle an increase in interference due to diversity. The weight can be defined as evaluating the order of handoff of the user. Other information that can be factored into the weight includes information about which sector is the dominant sector. If a sector has run out of Walsh codes but has assigned some Walsh codes to existing calls in hand-off and also happens to be one of the weaker links in handoff with the mobile, then such a Walsh code is a good candidate for reuse.
10. Angle of arrival of the user: This is related to the location of the user. If the angle of arrival of the user is known then the angles were the least interference is expected from such a user in the complement zone is also known. This weight is generated by evaluating the angle of arrival of the user as well as the angle of arrival of the user in the complement zone that is expecting to reuse the code. The more likely the user in the complement zone is in the null of the beam directed at the first user, the higher the weight.
11. If the Walsh code assigned to the user already in use by another zone within the same sector (and by how many). A Walsh code already in use one or more times, is much more risky to use again. The weight can be defined by evaluating the number of times the code is in reuse.
12. Is the user using a narrow beam: Some users may actually not be employing smart antenna technology and may actually be using the sector antenna, which is typically has a much wider beamwidth. In such cases, this user cannot have its Walsh code reused, as the signal energy is radiating throughout the sector. This also applies to users using a smart antenna, but whose beamwidth is currently large. A weight can be defined that takes the beamwidth of the antenna into account, and is defined by evaluating the beamwidth of the antenna used by the mobile.
13. Is there a zone with higher cross talk but that has better rated neighboring zones: On occasion, one zone may be preferred over another that actually has a lower cross-talk or interference characteristic because the adjacent zones have interference characteristics that are much worse. For example, if a "donor" mobile is has a velocity vector (is moving) and its adjacent zones have much higher interference levels, then it is preferable to select a zone that may presently have slightly higher interference (cross talk) levels but that has adjacent zones whose interference levels are notably lower than that of the zone that presently has the lowest level of interference.

The various weights above should be normalized to prioritize the importance between them. Then for each user in each zone, the overall sum of weights is computed. A fundamental limit should be set such that the user cannot be used even if the overall sum of the weights is high. In other words, if any of the weights individually is below a predetermined threshold, the Walsh code is removed from the list of available codes for reuse.

Each user requiring to reuse a code from its complement zone pair, should be assigned a code from a user with the highest weight total from the complement zone pair. For voice users or users using the Walsh code of the highest length, this should work quite effectively. However for reuse of codes with lower Walsh code length, the selection becomes more complicated. Then the following additional process is required, and is explained by an example. If a user requires a Walsh code of length 64, but all have been exhausted, then the zone pair complement is used to generate a set of possible codes to reuse. In the zone pair complement, all the users may be using Walsh codes of lengths of 128 or 64. All the users using Walsh codes of length 128 are collected in pairs, such that they are from the same node (i.e. two Walsh codes of length 128 can be generated from one Walsh code of length 64). Their weights are combined through some function (which can be as simple as $(1/W_1+1/W_2)^{-1}$). This automatically compensates for the risk of using codes from two users to assign to one user, albeit a higher rate. Then the code (now normalized for length 64) is reused from the user(s) with the highest weight. In the example above, if users also exist in the zone using Walsh codes of even lower length than 64, they may or may not be used as part of the selection process. In other words, the algorithm can be defined to include reusing codes of users of the same or lower data rate, or of users with all data rates. It is possible that a reuse code cannot be assigned a code from the zone complement pair because the individual lower rate users in that zone cannot form a Walsh code of sufficient length. Then the option of reusing codes from two zones to form a code of sufficient length of the user is also possible. In such a case, the second zone is picked using the same method as was used to pick the first zone, and will be the next likely candidate for the zone pair. Then the codes can be formed and reused from the two zones. Thresholds can also be set such that if codes can only be used from the zone complement pair, and the call can be queued or blocked.

Additionally, thresholds can be formed from the weights, such that if triggered, then the call is blocked or queued. That is if the weight is not enough to pick a code then the delay sensitive or circuit switched call is blocked, while the less delay sensitive packed switched call is queued.

Figure 4:
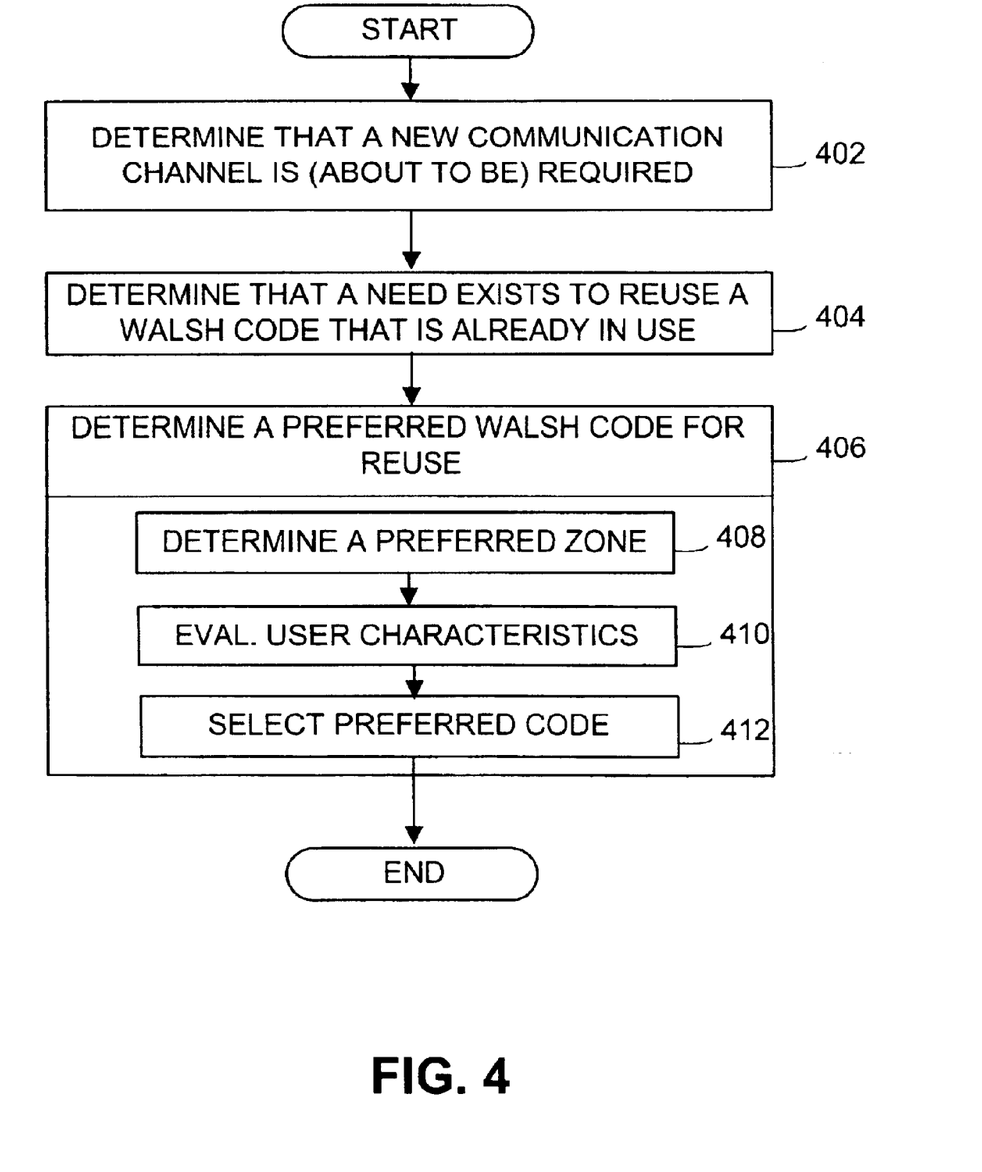
FIG. 4 illustrates a method for selecting a donor mobile station whose Orthogonal code is to be reused and assigned to a mobile station requiring a communication channel.

FIG. 4 illustrates a method for selecting a donor mobile station whose Orthogonal code is to be reused and assigned to a mobile station requiring a communication channel. Initially, a BTS determines that a new communication channel in a code division multiple access system is required or is about to be required (step 402). This determination may result from the BTS receiving a request for a communication channel, or determining that a collision between two mobile stations having the same communication channel is increasingly likely to occur and that one should be assigned a new communication channel.

Once the BTS determines a new communication channel is required, it determines if all of the Orthogonal codes (communication channels) are assigned and that there is a need to reuse an Orthogonal code that is currently assigned (step 404). Thereafter, the BTS determines a preferred Orthogonal code that is to be reused to create a communication channel for a mobile station (step 406). Determining the optimal Orthogonal code to reuse includes determining at least one preferred zone (step 408) from which an Orthogonal code may be reused, evaluating the mobile station characteristics of the mobile stations in the at least one preferred zone (step 410), and selecting a code that is to be reused (step 412).

While FIG. 4 suggests the selection of a code from a mobile station that is in a preferred zone, it is understood, of course, that the code that is selected may also be from any one of other zones that are evaluated. Typically, the code that is selected is one that is in a zone that is separated by a large angular amount from the zone to which the code will be assigned and having minimal cross-talk or interference properties with the zone the recipient is in, as well as evaluating specific mobile station characteristics. The mobile characteristics and weighting structure are described above.

It goes without saying that there are many different parameters that may be evaluated and the implementation and weights assigned to each of the factors may be varied from system to system. Accordingly, the specific relationships between the foregoing factors and factors described and taught below, is left to the specific system designer.

Figure 5:
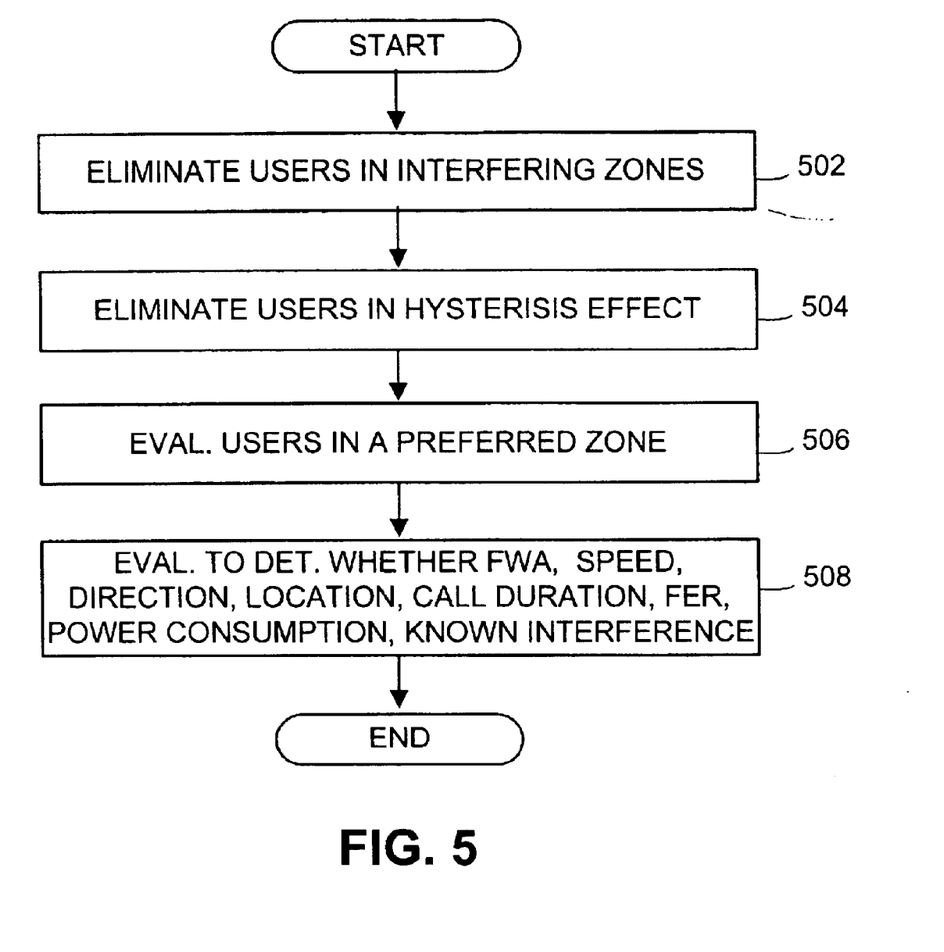
FIG. 5 is a flow chart illustrating a method for selecting a donor mobile station whose code is to be reused according to one aspect of the present invention.

FIG. 5 is a flow chart illustrating a method for selecting a donor mobile station whose code is to be reused according to one aspect of the present invention. Initially, the method includes eliminating any mobile stations that are located within an interfering zone (step 502) as well as eliminating those mobile stations that are under a timed hysterisis effect (step 504). A mobile station might be under a timed hysterisis effect, for example, that the mobile station's code has recently been assigned or the mobile station has recently undergone a hard handoff as it was recently on a collision path with another user using the same code.

After eliminating the mobile stations that cannot be considered for code reuse, the method includes examining the characteristics of the mobile stations within the preferred zone(s). The mobile station characteristics that are specifically evaluated in one embodiment of the present invention include determining whether the mobile station is a fixed wireless access mobile station (which can be determined by, among other factors, analyzing its mobile station ID), the mobile station speed (which may be determined by calculations that include common triangulation techniques or by a Global Positioning System receiver therewithin), the mobile station direction of travel (calculated from GPS measurements), the user's present location (GPS coordinate), the call duration, the frame error rate for the user, the reported power being used by the mobile station, a known interference between the donor mobile station and the recipient mobile station to which the code is to be reassigned or reused, a correlation of the user's time of call and speed, whether the mobile station is transmitting data or voice signals, and if data, whether the data is bursty or continuous, and other similar factors.

One reason that it is significant to determine whether a mobile station is a fixed wireless access mobile station or a mobile station is that stationary mobile stations are less likely, or not likely at all, to travel into a zone in which a code collision could occur. Accordingly, if the code is being reassigned to a mobile user, the probability of a collision is reduced by at least one-half (because only one mobile station is traveling). Along the same lines, the speed, direction and location of a mobile station that is under consideration for it's code to be reused are important factors in determining a likelihood that a collision could or would occur if it's code were to be reused. For example, a mobile station located near the center of the cell would be more likely to have a collision occur if the mobile station to which the code is reassigned moves from and through a plurality of zones. On the other hand, even if a mobile station under consideration for it's code to be reused, is not near the center, if it is traveling in a direction that cuts across a plurality of zones at a high rate of speed, the probability of it traveling into an interfering zone thereby resulting in a collision is greater.

Other factors that are considered that are somewhat similar to this in nature, include the duration of the call and, perhaps, a correlation between time and speed. For example, a typical wireless call lasts a little under two minutes on average. However, one may readily guess that mobile stations that are moving may be more likely to have shorter calls than stationary mobile stations. Accordingly, a correlation of time and speed may be analyzed as a part of determining whether a mobile station code is a good one for reassignment. For example, if one candidate mobile station is moving at a speed to indicate vehicular travel and the length of his call is under a minute, while another mobile station is stationary and his call is over three minutes in length, then the first candidate would be a better candidate for having his Orthogonal code reassigned because, on average, mobile stations having call and movement characteristics of the first mobile are likely to complete the call before the second mobile station.

With respect to the frame error rate and the power usage of the mobile station, these factors are important because, if all else if equal, it is desirable to use a code from a mobile station that is unlikely to require a new code in the immediate future. If the frame error rate for a particular mobile station is high or the power consumption is high, that mobile station is likely already experiencing interference and thus his code is not a desirable one for reuse.

Figure 6:
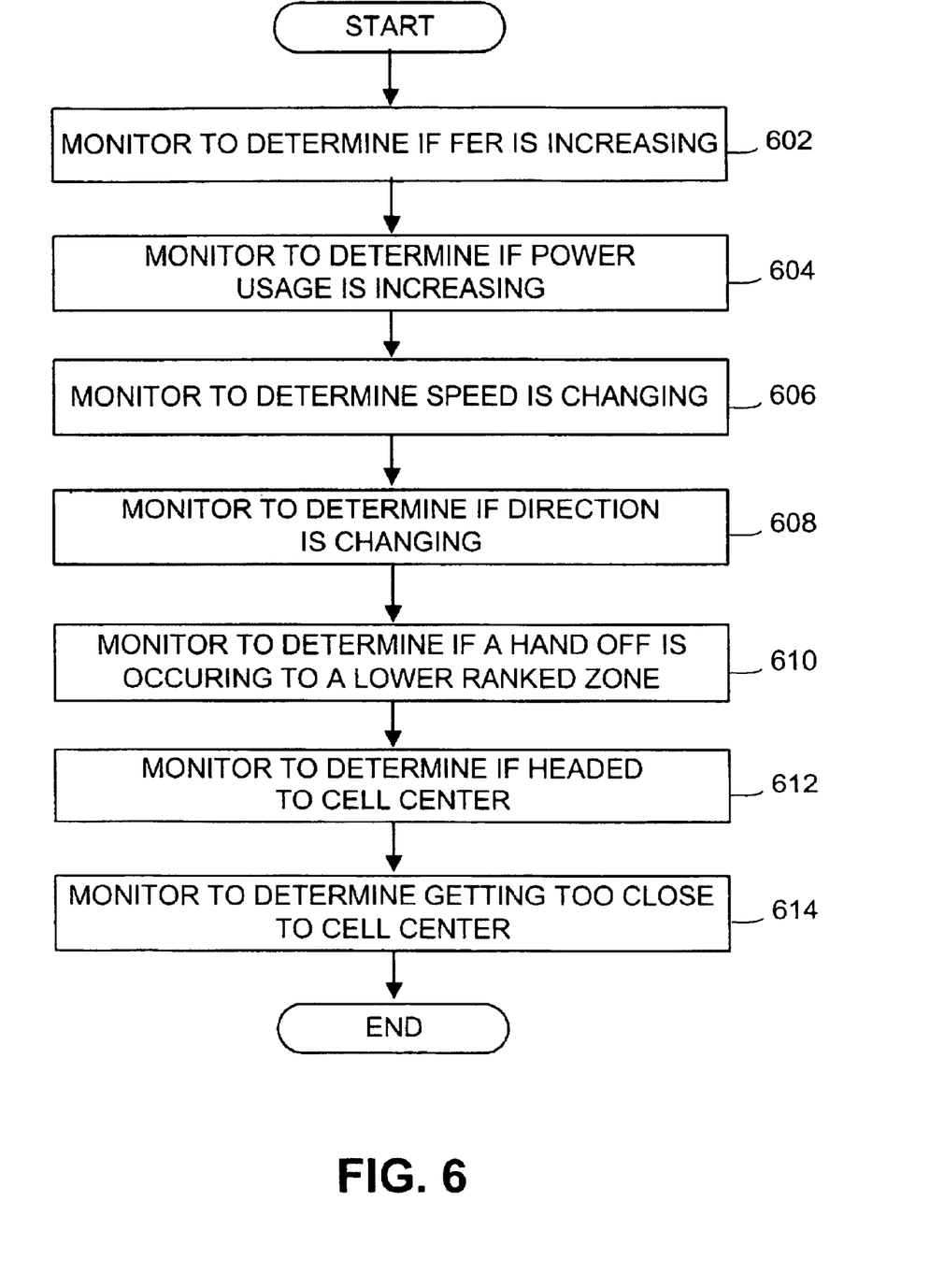
FIG. 6 is a flow chart illustrating a method for determining whether a collision is about to occur between two mobile stations having the same communication channel (Orthogonal code) according to one embodiment of the invention.

FIG. 6 is a flow chart illustrating a method for determining whether a collision is about to occur between two mobile stations having the same communication channel (Orthogonal code) according to one embodiment of the invention. In general, the method of FIG. 6 is an ongoing method that occurs whenever two or more mobile stations are using the same Orthogonal code. The analysis described is one that is performed for every set of mobile stations that share an Orthogonal code (communication channel) and is done prior to the actual occurrence of a collision. The factors that are analyzed in determining whether a mobile station having a code that is also assigned to another mobile station should be given yet another code or communication channel includes determining whether the frame error rate is increasing relative to a threshold value (step 602), whether the power usage is increasing relative to a defined upper limit (step 604), evaluating the change in speed (step 606), or changing direction (step 608) of the user, determining whether the mobile station is starting to go into a handoff or has gone into a handoff with a non-compatible zone (step 610) or whether the mobile station is moving towards a cell center (step 612) or is traveling too close to a cell center (step 614).

Figure 7:
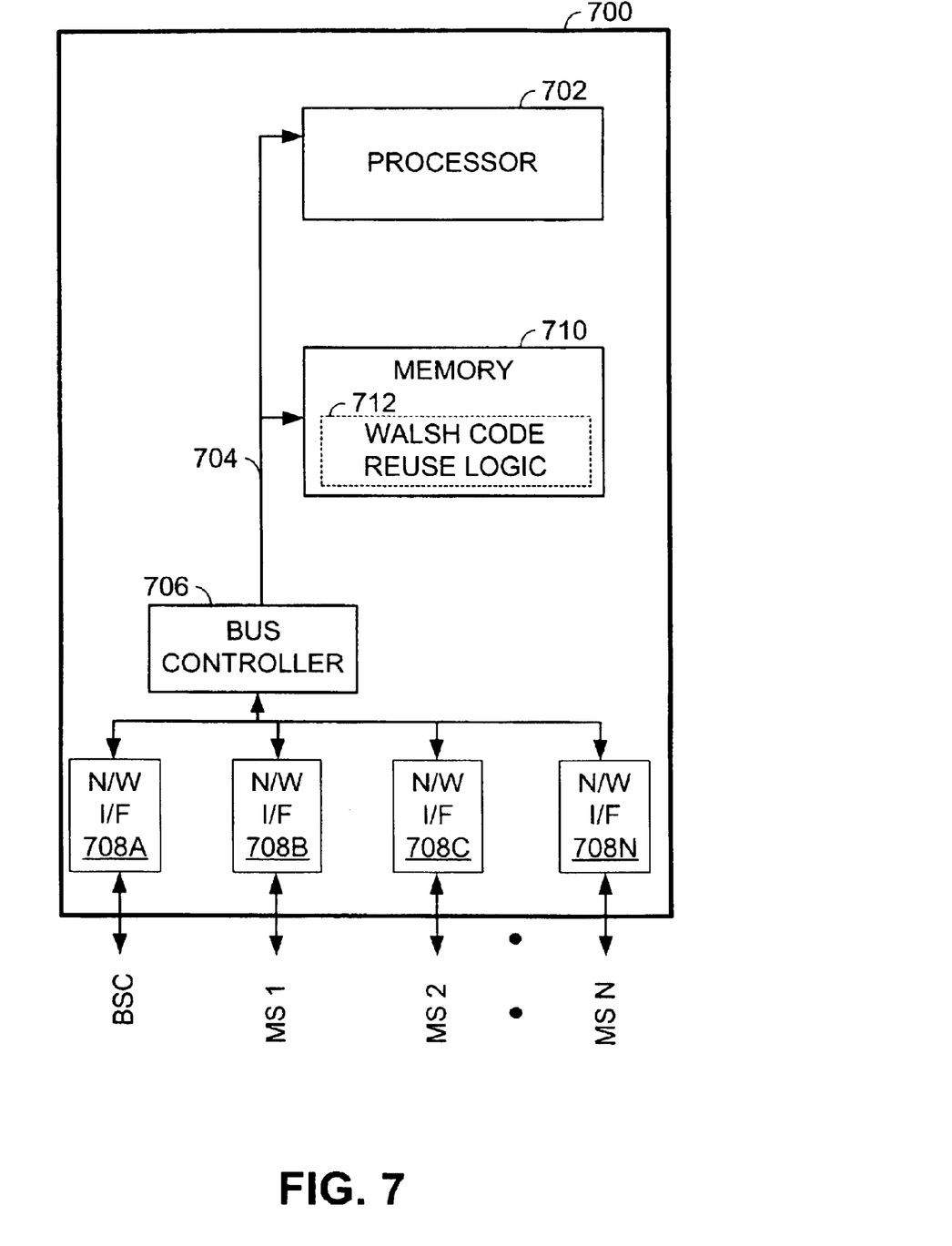
FIG. 7 is a functional block diagram of a base station transceiver system that is formed according to one embodiment of the present invention.

FIG. 7 is a functional block diagram of a base station transceiver system that is formed according to one embodiment of the present invention. Referring now to FIG. 7, a BTS 700 includes a processor 702 that is coupled to communicate over a bus 704. Bus 704, and the communications thereon, are controlled by a bus controller 706 that is coupled bus 704. Bus controller 706 is also coupled to a network port 708.

A memory 710 also is coupled to bus 704 and is for storing data as well as computer instructions that define the operation of the BTS. In particular, memory 710 includes a portion 712 for storing computer instructions that define the operational logic for assigning and reusing Orthogonal codes as described herein this application. It is understood, of course, that a computer instruction and processor driven system as shown in FIG. 7 may be replaced with a system whose logical operation is defined at least in part, in hardware.

In operation, processor 702 communicates with memory 710 over bus 704 to receive the computer instructions that define the operational logic of the BTS and to execute the same to achieve the operational functionality that is described herein. Accordingly, processor 702 communicates with external devices through network port 708 to receive communication signals, for example, from the various mobile stations of the mobile stations, to determine when an Orthogonal code needs to be assigned or reassigned. As a part of this operation, processor 702 stores within memory 710, the operational parameters of the system (cell) that it is serving to determine what Orthogonal code should be reused by a mobile station needing an Orthogonal code to create a new communication channel.

While the invention is susceptible to various modifications and alternative forms, specific embodiments thereof have been shown by way of example in the drawings and detailed description. It should be understood, however, that the drawings and detailed description thereto are not intended to limit the invention to the particular form disclosed, but on the contrary, the invention is to cover all modifications, equivalents, and alternatives falling within the spirit and scope of the present invention as defined by the claims. As may be seen, the described embodiments may be modified in many different ways without departing from the scope or teachings of the invention.

What is claimed is:

1. A method for assigning Orthogonal Walsh codes from one set of Walsh codes in one of an omni-cell or a cell sector in a code division multiple access network to create communication channels between the mobile stations and a base station, comprising:

determining that there is a mobile station that requires a Walsh code and that there are not available codes from the one set of Walsh codes within the omni-cell or cell sector need to reuse a code within a defined cell area;

determining an optimal mobile station whose Orthogonal code is to be reused; and assigning the determined Walsh code that is to be re-used to the mobile station that needs the Walsh code to establish a communication channel wherein the determined Walsh code is assigned to two mobile stations within one of the omni-cell or cell sector at the same time.

2. The method of claim 1 further comprising defining a plurality of zones.

3. The method of claim 2 further comprising statically building a ranked list of zones according to interference there between.

4. The method of claim 2 further comprising statically building a ranked list of zones according to angular separation.

5. The method of claim 2 further comprising defining a ranked list of zones according to interference between zones and according to angular separation between zones.

6. The method of claim 5 wherein zones in which side lobes are present for a primary lobe in a zone in which the reused code is to be assigned are eliminated from the ranked list.

7. The method of claim 6 wherein the mobile station is selected by considering, at least in part, whether the mobile station is a fixed wireless access user.

8. The method of claim 6 wherein the mobile station is selected by considering, at least in part, its speed.

9. The method of claim 6 wherein the mobile station is selected by considering, at least in part, its direction of travel.

10. The method of claim 6 wherein the mobile station is selected by considering, at least in part, its location.

11. The method of claim 6 wherein the mobile station is selected by considering, at least in part, its call duration length.

12. The method of claim 6 wherein the mobile station is selected by considering, at least in part, its frame error rate.

13. The method of claim 6 wherein the mobile station is selected by considering, at least in part, its power consumption level.

14. The method of claim 6 wherein the mobile station is selected by considering, at least in part, a known interference between the mobile station and the mobile station to whom the code is to be reassigned.

15. The method of claim 6 wherein the mobile station is selected by considering, at least in part, a correlation of its time and speed.

16. The method of claim 6 wherein the mobile station is selected by considering, at least in part, whether a hysterisis is in effect for the user.

17. The method of claim 6 wherein the mobile station is selected by considering, at least in part, according to whether the call is a data or voice call.

18. The method of claim 6 wherein the mobile station is selected by considering, at least in part, whether, if the call is a data call, whether it is bursty or continuous.

19. The method of claim 1 wherein the need to reuse an Orthogonal code occurs because of a determination that a collision is eminent between the two mobile stations using the same Orthogonal code.

20. The method of claim 19 wherein the need is determined prior to the occurrence of an actual collision.

21. The method of claim 19 wherein the determination is made by considering whether the frame error rate is increasing.

22. The method of claim 19 wherein the determination is made by considering whether the power usage is increasing.

23. The method of claim 19 wherein the determination is made by considering whether there is a significant change in speed.

24. The method of claim 19 wherein the determination is made by considering whether there is a significant change in direction.

25. The method of claim 19 wherein the determination is made by considering whether a handoff is occurring to a non-compatible zone.

26. The method of claim 19 wherein the determination is made by considering whether the mobile station is moving towards the cell center.

27. The method of claim 19 wherein the determination is made by considering whether the mobile station is too close to the cell center.

28. The method of claim 19 wherein the determination is made by considering whether the signal quality falls below a specified threshold.

29. A method for assigning an Orthogonal code in a code division multiple access network, comprising:

determining that a need exists to reuse an Orthogonal code that is already assigned to a mobile station for creating a communication channel in one of an omni-cell or cell sector;

defining a plurality of zones and generating a mapping that assigns weights representing zone interference to rank each defined zone relative to other zones based upon primary and side lobe radiation patterns;

evaluating at least one of zone interference, zone separation and mobile station characteristics including location and speed for those mobile stations that already have been assigned Orthogonal code and selecting an Orthogonal code to be reused and assigning the selected Orthogonal code to a mobile station that is requiring an Orthogonal code within the omni-cell or cell sector based upon the evaluation.

30. The method of claim 29, wherein the candidate donor mobile station's characteristics that are evaluated include at least one of whether the candidate donor mobile station is a fixed wireless access user, its speed, its direction, the candidate donor location, the candidate donor's call duration, the candidate donor's frame error rate, the candidate donor's power consumption, whether the candidate donor is transmitting data or voice, if the candidate donor is transmitting data, whether it is bursty or continuous data.

31. The method of claim 29, wherein selecting a donor mobile station includes selecting an Orthogonal code for a mobile station whose location is in a zone that has significant angular separation from the zone in which a requesting mobile station is located when the requesting mobile station is the one needing to reuse an Orthogonal code.

32. The method of claim 29, further comprising monitoring the Orthogonal code mobile station characteristics for the two mobile stations using the same Orthogonal code to determine whether a likelihood of a collision is increasing beyond a specified threshold.

33. A base station transceiver system for assigning Orthogonal Walsh codes from one set of Walsh codes to create communication channels in a cell sector of a code division multiple access network, comprising:

circuitry for performing routine base station transceiver system operations; and logic circuitry for selecting an Orthogonal code from the one set of Walsh codes in the cell sector for reuse from a donor mobile station located in the cell sector according to the location of the mobile station and specified mobile station characteristics.

34. The base station transceiver system of claim 33, wherein the logic circuitry evaluates the angular separation between a cell portion in which the donor mobile is located and a cell portion in which the code is to be reused, all within the same cell sector.

* * * * *